(12) United States Patent
Luk

(10) Patent No.: US 10,048,652 B1
(45) Date of Patent: Aug. 14, 2018

(54) ANALOG TIMEPIECE WITH STEPS ILLUSTRATING ARRANGEMENT

(71) Applicant: Tai Wai Luk, Hong Kong (HK)

(72) Inventor: Tai Wai Luk, Hong Kong (HK)

(*) Notice: Subject to any disclaimer, the term of this patent is extended or adjusted under 35 U.S.C. 154(b) by 0 days.

(21) Appl. No.: 15/594,401

(22) Filed: May 12, 2017

(51) Int. Cl.
*G04B 47/06* (2006.01)
*G04B 19/06* (2006.01)
*G04B 19/04* (2006.01)
*G01C 22/00* (2006.01)

(52) U.S. Cl.
CPC ......... *G04B 47/063* (2013.01); *G01C 22/006* (2013.01); *G04B 19/04* (2013.01); *G04B 19/06* (2013.01)

(58) Field of Classification Search
CPC ........ G04B 19/06; G04B 47/06; G04B 19/04; G04B 47/061; G04G 21/025; G04G 21/02
See application file for complete search history.

(56) References Cited

U.S. PATENT DOCUMENTS

| 193,224 | A | * | 7/1877 | Church | G01C 22/006 |
| | | | | | 235/105 |
| 694,652 | A | * | 3/1902 | Kuhn | G01C 22/006 |
| | | | | | 235/105 |
| 7,596,057 | B2 | * | 9/2009 | Linder | G04C 3/146 |
| | | | | | 368/228 |
| 2008/0027675 | A1 | * | 1/2008 | Noguchi | G01C 22/006 |
| | | | | | 702/160 |
| 2015/0253735 | A1 | * | 9/2015 | Watterson | G04B 47/063 |
| | | | | | 368/10 |
| 2015/0253736 | A1 | * | 9/2015 | Watterson | G04G 21/04 |
| | | | | | 368/10 |
| 2016/0341568 | A1 | * | 11/2016 | Roush | G01C 22/006 |

OTHER PUBLICATIONS

7 Old School Smart Fitness Watches—shape.com/fitness/workout-gear/7-old-school-smart-fitness-watches-are-totally-modern—Dec. 3, 2015.*
Timex Metropolitian+ Activity Tracker—amazon.com/Timex-TWG012600-Metropolitan-Activity-Silicone/dp/B017UEGD4A—Mar. 24, 2018.*
Analog pedometer search—google.com Mar. 24, 2018.*
Garmin vivomove Premium—.holabirdsports.com/garmin-vivomove-premium.html—Mar. 24, 2018.*

(Continued)

*Primary Examiner* — Sean Kayes
(74) *Attorney, Agent, or Firm* — Tsz Lung Yeung

(57) ABSTRACT

An analog timepiece includes a main casing, a main core unit, a main dial, at least one time indicating hand, and a steps illustrating arrangement. The steps illustrating arrangement includes a steps sensor, a control unit, a first steps dial and a second steps dial, a first steps indicating hand, a gear unit, and a second steps indicating hand. When the steps sensor senses a predetermined number of steps, the control unit is configured to drive the first steps indicating hand to rotate for one fine steps marking on the first steps dial. When the first indicating hand move over a predetermined number of fine steps markings, the to second indicating hand is arranged to be driven to move one collective steps marking on the second steps dial.

20 Claims, 8 Drawing Sheets

(56) References Cited

OTHER PUBLICATIONS

Garmin vivomove—cabelas.com/product/GARMIN-VIVOMOVE-SPORT/2359852.uts—Mar. 24, 2018.*
Ananlog pedometer—ebay.com/i/182401582516?chn=ps&displtem=1—Mar. 24, 2018.*
New Haven Pedometer—etsy.com/listing/561058263/vintage-new-haven-pedometer-pocket-watch—Mar. 24, 2018.*
Vintage New Haven Pedotmeters—etsy.com/listing/531119443/vintage-new-haven-pedometers-and-elgin?ref=landingpage_similar_listing_bot-1—Mar. 24, 2018.*
Vintage New Haven Pedometers—thea.com/Watches-Pedometers-Vintage-New-Haven-Pedometer/—Mar. 24, 2018.*
New Haven Pedometer How Does It Work?—mb.nawcc.org/threads/new-haven-pedometer-how-does-it-work.141198/—(original thread start Mar. 10, 2017) printed Mar. 24, 2018.*
Pedometers—mathsinstruments.me.uk/page70.html—Mar. 24, 2018.*

* cited by examiner

ANALOG TIMEPIECE WITH STEPS ILLUSTRATING ARRANGEMENT

BACKGROUND OF THE PRESENT INVENTION

Field of Invention

The present invention relates to a timepiece, and more particularly to an analog watch comprising a steps illustrating arrangement which is capable of conveniently illustrating the steps completed by a wearer through the use of two indicating hands.

Description of Related Arts

A conventional timepiece, such as a conventional analog quartz watch, usually comprises a main casing, a main control unit (MCU), a plurality of time indicating hands connected to the MCU, and a plurality of watch bands connected to the main casing. As a matter of common knowledge, a conventional analog quartz clock is incapable of counting and displaying the number of steps a wearer has completed.

In recent years, there have been a number of smartwatches which are capable of counting the number of steps a wearer has completed in a predetermined period of time. A common feature of these smartwatches is that the number of steps that a wearer has completed is invariably displayed by a liquid crystal display (LCD) screen or Light Emitting Diode (LED) display screen. Thus, the user may simply read the number of steps from a LCD screen or through a mobile device to which the smartwatch is connected. A major disadvantage of this is that a user must wear a smartwatch in order to enjoy the steps counting function. Another disadvantage is that the steps counting information is invariably displayed by the LCD screen or LED display screen, which are not usually equipped in analog watches.

Hence, there is no analog watches which may perform the steps counting function by using analog display mechanism. As a result, there is a need to improve upon the conventional timepiece technology and develop an analog timepiece for displaying steps counting information in an analog manner.

SUMMARY OF THE PRESENT INVENTION

Certain variations of the present invention provide an analog timepiece such as an analog watch comprising a steps illustrating arrangement which is capable of conveniently illustrating the steps completed by a wearer through the use of indicating hands.

In one aspect of the present invention, it provides an analog timepiece, comprising:

a main casing;

a main core unit received in the main casing;

a main dial supported in the main casing, the main dial having a plurality of time markings;

at least one time indicating hand rotatably connected to the main core unit at a position above the main dial; and a steps illustrating arrangement, which comprises:

a steps sensor received in the main casing for sensing the number of steps of a wearer;

a control unit electrically connected to the steps sensor;

a first steps dial and a second steps dial provided on the main dial, first steps dial having a plurality of fine steps markings, the second steps dial having a plurality of collective steps markings;

a first steps indicating hand rotatably connected to the control unit and positioned above the first steps dial;

a gear unit connected to the first steps indicating hand; and a second steps indicating hand rotatably connected to the gear unit and positioned above the second steps dial, in such a manner that when the steps sensor senses a predetermined number of steps, the control unit is configured to drive the first steps indicating hand to rotate one fine steps marking, wherein when the first indicating hand move over a predetermined number of fine steps markings, the second indicating hand is arranged to be driven by the gear unit to move one collective steps marking on the second steps dial.

In another aspect of the present invention, it provides an analog timepiece, comprising:

a main casing;

a main core unit received in the main casing, the main core unit comprising a driving core which comprises a microcontroller unit for controlling illustration of time and steps, the microcontroller unit comprising a processing circuitry, a first driving unit, and a second driving unit;

a main dial supported in the main casing, the main dial having a plurality of time markings;

at least one time indicating hand rotatably connected to the first driving unit of the main core unit at a position above the main dial; and a steps illustrating arrangement, which comprises:

a steps sensor received in the main casing and electrically connected to the microcontroller unit of the main core unit for sensing the number of steps;

a first steps dial and a second steps dial provided on the main dial, the first steps dial having a plurality of fine steps markings, the second steps dial having a plurality of collective steps markings;

a first steps indicating hand rotatably connected to the second driving unit of the microcontroller unit and positioned above the first steps dial;

a gear unit connected to the first steps indicating hand; and a second steps indicating hand rotatably connected to the gear unit and positioned above the second steps dial, in such a manner that when the steps sensor senses a predetermined number of steps, the steps monitoring module of the main core unit is configured to drive the first steps indicating hand to rotate one fine steps marking, wherein when the first indicating hand move over a predetermined number of fine steps markings, the second indicating hand is arranged to be driven by the gear unit to move one collective steps marking on the second steps dial.

This summary presented above is provided merely to introduce certain concepts and not to identify any key or essential features of the claimed subject matter.

DETAILED DESCRIPTION OF THE PREFERRED EMBODIMENT

Figure 1:
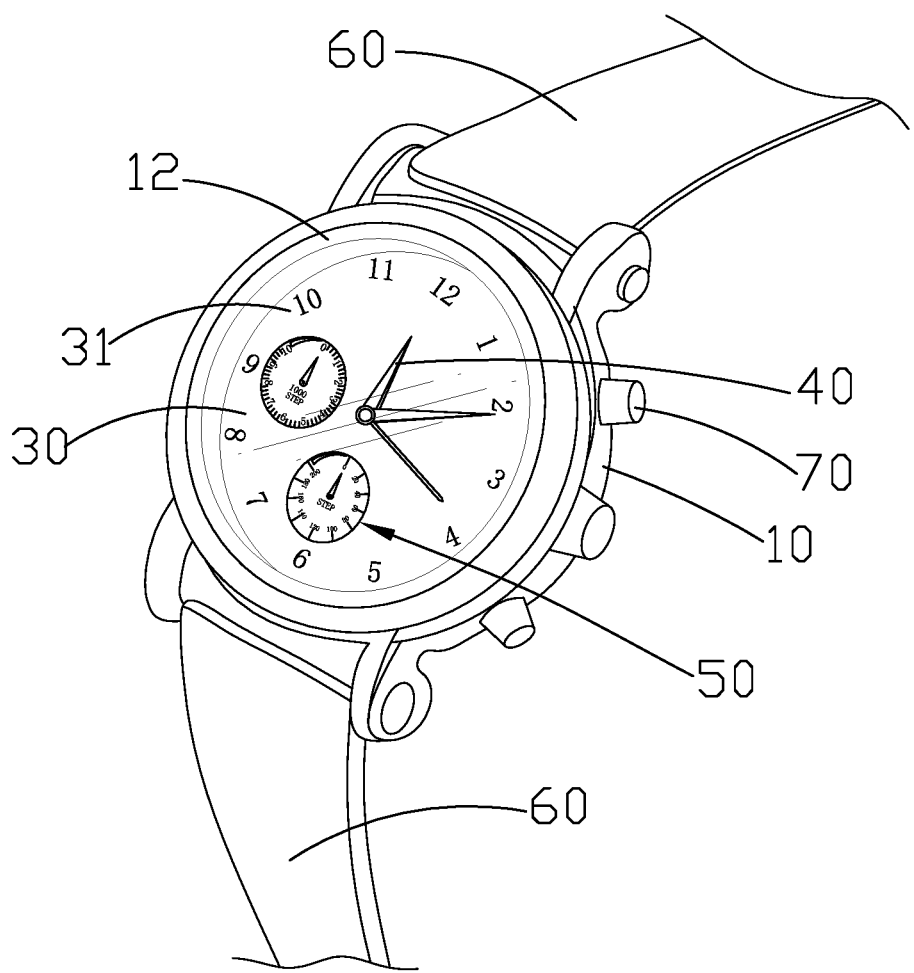
FIG. 1 is a perspective view of an analog timepiece according to a first preferred embodiment of the present invention.
Figure 2:
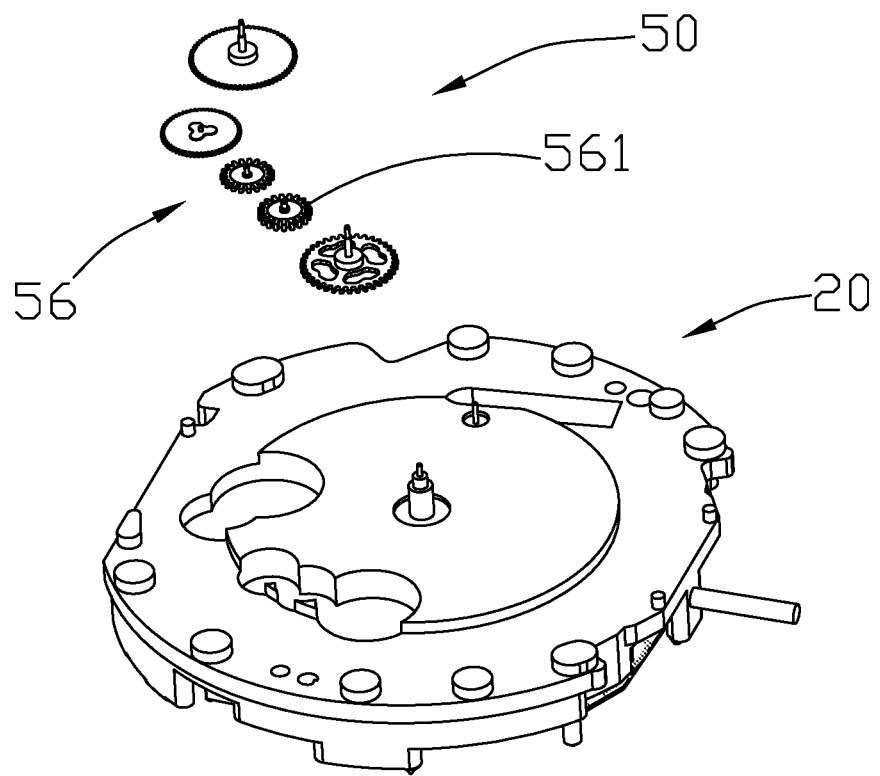
FIG. 2 is an exploded perspective view of the analog timepiece according to the first preferred embodiment of the present invention.
Figure 3:
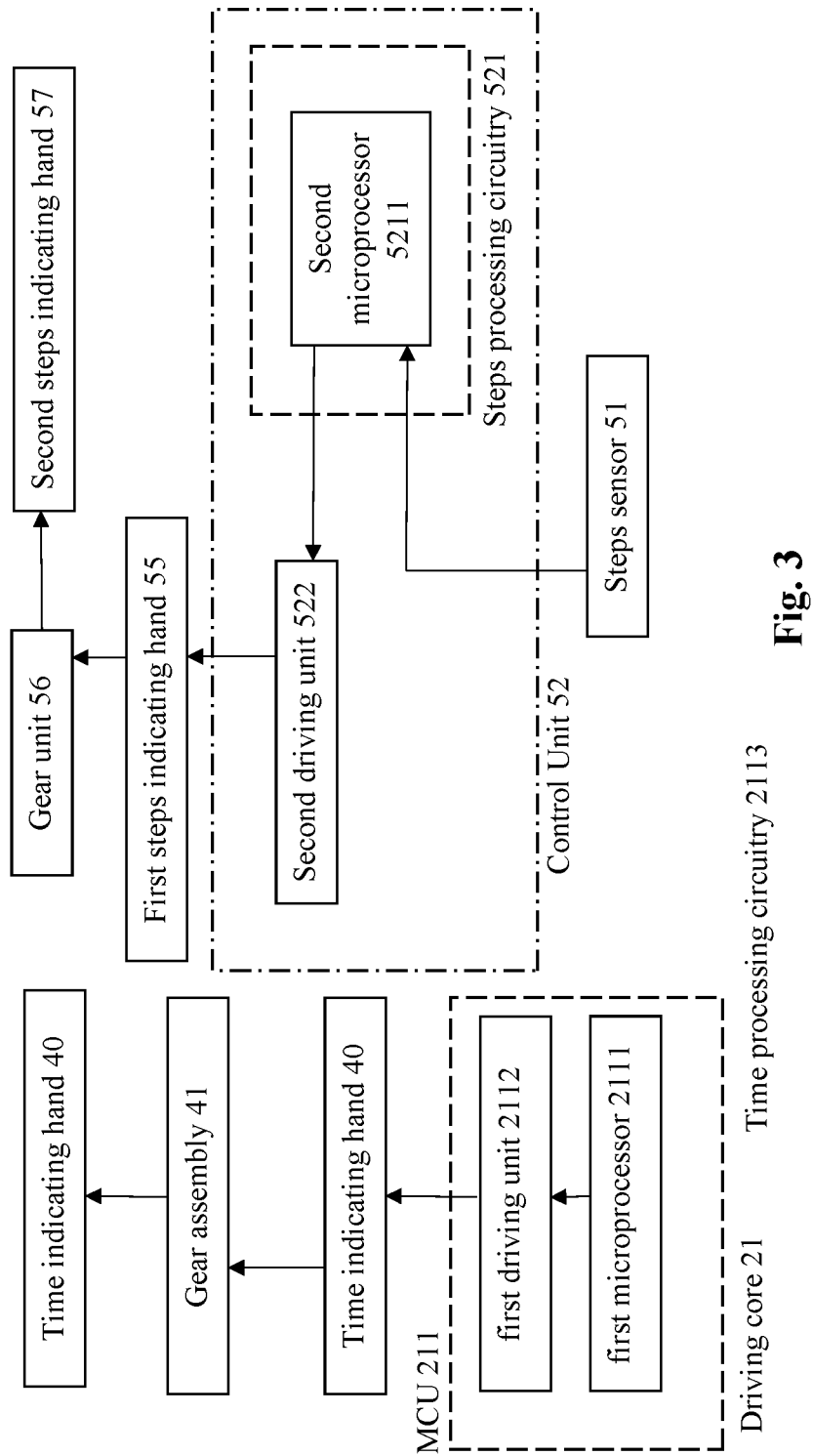
FIG. 3 is a block diagram of the internal structure of the analog timepiece according to the first preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIGS. 1 to 4 of the drawings, an analog timepiece such as an analog watch according a first preferred embodiment of the present invention is illustrated. Broadly, the analog timepiece such as the analog watch may comprise a main casing 10, a main core unit 20 received in the main casing 10, and a main dial 30, at least one time indicating hand 40, and a steps illustrating arrangement 50.

The main dial 30 may be supported in the main casing 10 and have a plurality of time markings 31 formed on a top surface of the main dial 30.

The time indicating hand 40 may be rotatably connected to the main core unit 20 at a position above the main dial 30 for indicating time information through pointing at different time markings 31.

The steps illustrating arrangement 50 may comprise a steps sensor 51, a control unit 52 electrically connected to the steps sensor 51, a first steps dial 53, a second steps dial 54, a first steps indicating hand 55, a gear unit 56, and a second steps indicating hand 57.

The steps sensor 51 may be received in the main casing 10 for sensing the number of steps of a wearer of the analog timepiece of the present invention.

The first steps dial 53 and the second steps dial 54 may be provided on the main dial 30. The first steps dial 53 may have a plurality of fine steps markings 531. The second steps dial 54 may have a plurality of collective steps markings 541.

The first steps indicating hand 55 may be rotatably connected to the control unit 52 and positioned above the first steps dial 53. The gear unit 56 may be connected to the first steps indicating hand 55.

The second steps indicating hand 57 may be rotatably connected to the gear unit 56 and positioned above the second steps dial 54, in such a manner that when the steps sensor 51 senses a predetermined number of steps, the control unit 52 may be configured to drive the first steps indicating hand 55 to rotate by one fine steps marking 531. When the first indicating hand 55 moves over a predetermined number of fine steps markings 531, the second indicating hand 54 may be arranged to be driven by the gear unit 56 to move one collective steps marking 541 on the second steps dial 54.

According to the first preferred embodiment of the present invention, the analog timepiece mentioned above may be configured as having a number of variations. For example, the analog timepiece may be configured as an analog watch.

Alternatively, the analog timepiece may also be configured as an analog pocket watch. In this first preferred embodiment of the present invention, the analog timepiece may be configured as a watch. Thus, the analog timepiece may further comprise a plurality of watch bands 60 extended from two sides of the main casing 10.

The term "analog" may refer to the mode of display of time by the analog timepiece of the present invention. Thus, the analog timepiece may display time information (hours, minutes and/or seconds) by at least one time indicating hand 40 rotating above the main dial 30 in an incremental manner. The main casing 10 may be configured as having a circular cross section, and may have a receiving cavity for accommodating other components of the analog timepiece. Note that other cross sectional shapes of the main casing 10 may also be possible. This meaning of "analog" is applicable to the first preferred embodiment and the second preferred embodiment of the present invention as described below.

The main core unit 20 may comprise a driving core 21 received in the main casing 20. The driving core 21 may utilize one of the three driving mechanisms. First, the driving core 21 may comprise a quartz driving unit. The quartz driving unit may be configured as a conventional electronic oscillator that is regulated by a quartz crystal. Alternatively, the driving core 21 may comprise a microcontroller unit (MCU) 211 that keeps time. The MCU 211 may comprise a time processing circuitry 2113 and a first driving unit 2112 such as a step motor for driving the time indicating hand 40. The time processing circuitry 2113 may comprise a first microprocessor 2111 for processing time information.

The main dial 30 may be provided on the main casing 10 for providing the time markings 31. The time indicating hand 40 may be connected to the main core unit 20 in a rotatably movable manner so that the time indicating hand 40 may rotate on the main dial 30 in an incremental manner. The time indicating hand 40 may be driven to rotate so as to point to predetermined time markings 31 for indicating time information. Thus, the time markings 31 may include second markings, minutes markings, and/or hour markings.

When more than one time indicating hands 40 are utilized, a gear assembly 41 may be connected to the time indicating hands 40 so as to drive the time indicating hands 40 to incrementally rotate in predetermined intervals. For example, when three time indicating hands 40 (namely, a second indicating hand, a minute indicating hand and a hour indicating hand) are utilized, the one of them may be connected to the main core unit 20 for indicating second information. The gear assembly 41 may be utilized so that when the second indicating hand has moved 60 second markings on the main dial 30, the minute indicating hand may move one minute marking on the main dial 30, and when the minute indicating hand has moved 60 minute markings, the hour indicating hand may move one hour marking on the main dial 30.

The main casing 10 may further comprise a cover 12 which may have a predetermined light transmissivity for allowing a user of the present invention to visually observe the main dial 30 and the time indicating hands 40 from an exterior of the main casing 10. In this first preferred embodiment, the cover 12 may be made of glass material so that it is transparent. The main dial 30 and the time indicating hands 40 may be easily seen by a user wearing the analog timepiece of the present invention.

The steps sensor 51 of the steps illustrating arrangement 50 may be configured as a steps counter which is received in the main casing 10 for counting the number of steps a wearer of the present invention has moved. An exemplary embodiment of the steps sensor 51 may be a microelectro-mechanical (MEMS) inertial sensor.

The control unit 52 may comprise a steps processing circuitry 521 and a second driving unit 522 such as a step motor received in the main casing 10. The steps processing circuitry 521 may be implemented in a Printed Circuit Board (PCB) and may comprise a second microprocessor 5211. The steps sensor 51 may be connected to the second microprocessor 5211 of the steps processing circuitry 521. The second microprocessor 5211 may be programmed to process and interpret the signals obtained from the steps sensor 51.

Figure 4:
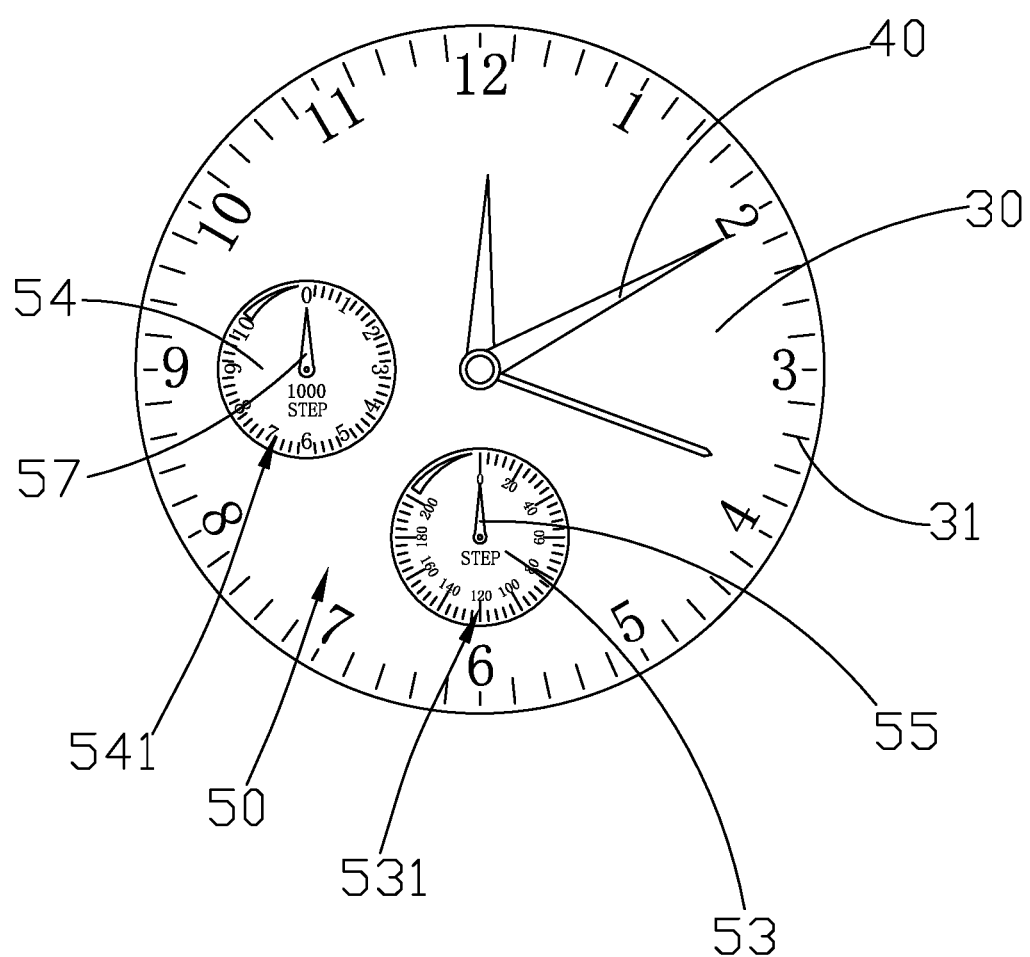
FIG. 4 is schematic diagram of the analog timepiece according to the first preferred embodiment of the present invention.

As shown in FIG. 4 of the drawings, each of the first steps dial 53 and the second steps dial 54 may have a circular cross sectional shape and may be provided on the main dial 30 for ease of being observed by a wearer of the present invention. The first step dial 53 may contain a predetermined number of fine steps markings 531 distributed on the first step dial 53. In this first preferred embodiment, each fine steps marking 531 may represent four steps (or any other number of steps) moved by the user of the present invention. The first steps dial 53 may have altogether fifty fine steps markings 531 formed thereon (or any other number of fine steps markings 531). Thus, when the first steps indicating hand 55 has rotated or traveled fifty fine steps markings 531 on the first steps dial 53, the user has actually walked 4×50=200 steps. The fine steps markings 531 may signify the number of steps a user has walked. For example, markings of "20", "40", "60", "80" . . . "200" may be formed on the first steps dial 53 to inform the user that twenty, forty, sixty, eighty . . . two hundred steps have been completed respectively, as shown in FIG. 4 of the drawings. Note that each fine step marking 531 may represent other number of steps sensed by the steps sensor 51. The number of fine steps markings 531 on the first steps dial 53 may also be varied. The above-described numbers are for illustrative only and merely constitute the first preferred embodiment of the present invention.

On the other hand, the second steps dial 54 may have a predetermined number of collective steps markings 541 evenly distributed on the second steps dial 54. In this first preferred embodiment, each collective steps marking 541 may represent two hundred steps (i.e. the maximum number of steps sensed by the steps sensor 51 and counted on the first steps dial 53) moved by the user of the present invention. The second steps dial 54 may have altogether fifty collective steps markings 541 formed thereon. Thus, when the second steps indicating hand 57 has rotated or traveled one circumference on the second steps dial 54, the user has actually walked 200×50=10,000 steps. Note that each collective step marking 541 may represent other number of steps sensed by the steps sensor 51. The number of collective steps markings 541 on the second steps dial 54 may also be varied. The above-described numbers are for illustrative only and merely constitute the first preferred embodiment of the present invention.

As shown in FIG. 4 of the drawings, the fifty fine steps markings 531 may be distributed on the first steps dial 53 in a manner which resembles the first fifty seconds/minutes on a conventional dial for a timepiece. In other words, when the entire circumference of the first steps dial 53 represents 360°, the fifty fine steps markings 531 may be evenly distributed on a 300° sector of the first steps dial 53. Similarly, the fifty collective steps markings 541 may be distributed on the second steps dial 54 in a manner which resembles the first fifty seconds/minutes on a conventional dial for a timepiece. When the entire circumference of the second steps dial 54 represents 360°, the fifty collective steps markings 541 may be evenly distributed on a 300° sector of the second steps dial 54.

The gear unit 56 may connect the first steps indicating hand 55 to the second steps indicating hand 57 in such a manner that when the first steps indicating hand 55 has moved fifty fine steps markings 531 (i.e. the first steps indicating hand 55 has traveled through all of the fine steps marking 531 formed on the first steps dial 53), the gear unit 56 may be arranged to drive the second steps indicating hand 57 to move one collective steps marking 541 on the second steps dial 54. The gear unit 56 may comprise a plurality of gears 561 connecting the first steps indicating hand 55 to the second steps indicating hand 57.

At the same time, when the first steps indicating hand 55 has traveled fifty fine steps markings 531 on the first steps dial 53, the control unit 52 may rapidly drive the first steps indicating hand 55 through the second driving unit 522 to move on the first steps dial 53 back to the initial starting position of the first steps indicating hand 55 so that it may be prepare to start a next cycle of steps illustration. By observing the position of the first steps indicating hand 55 and the second steps indicating hand 57, a user of the present invention may visually observe the number of steps that he has traveled. This feature is in stark contrast with conventional digital smart watches because for conventional smart watches, the number of steps are not displayed in digital form.

When the second steps indicating hand 57 has traveled to the 10,000 steps mark as represented by the collective steps marking 541 (i.e. the second steps indicating hand 57 has traveled through all the collective steps markings 541 on the second steps dial 54), the control unit 52 may be configured to drive the first step indicating hand 56 through the second driving unit 522 to rapidly and repetitively move on the first steps dial 53 so as to drive the second steps indicating hand 57 back to the "0" step position, which may be the initial starting position of the second steps indicating hand 57.

It is worth mentioning that the movement of the first steps indicating hand 55 may trigger movement of the second steps indicating hand 57 through the second gear unit 56. Thus, when the first steps indicating hand 55 has traveled at least one fine step marking 531, the second steps indicating hand 57 may be driven to move on the second steps dial 54 (even very slightly). Thus, when the first steps indicating hand 55 has traveled at least one fine step marking 531, and a user of the present invention wishes to reset the first steps indicating hand 55 and the second steps indicating hand 57 back to their initial position respectively, the first steps indicating hand 55 may be driven to move repetitively on the first steps dial 53 (so that the second steps indicating hand 57 may also be driven to move as well) until both the first steps indicating hand 55 and the second steps indicating hand 57 are moved back to their initial positions respectively.

Thus, the analog timepiece of the present invention may further comprise a plurality of actuation buttons 70 provided on the main casing 10 for actuating the operation of the steps illustrating arrangement 50. The actuation buttons 70 may be utilized for activating the steps illustrating arrangement 50 so that the analog timepiece may start counting steps. Moreover, the actuation buttons 70 may allow the user to reset the first steps indicating hand 55 and the second steps indicating hand 57 back to their original starting positions respectively.

It is worth mentioning that the steps illustrating arrangement 50 and the main core unit 20 may be separately operatively and provided in the main casing 10 so that the time displaying mechanism and the steps illustrating mechanism may form two separate systems. The mechanism used for displaying time may be distinct and separated from the mechanism used for illustrating steps. The two systems, however, may draw power from a common battery accommodated in the main casing 10. However, if the analog timepiece is configured as a mechanical watch in which no battery is necessary for displaying time, a battery may nevertheless be installed in the main casing 10 for providing power to the steps illustrating arrangement 50.

Figure 5:
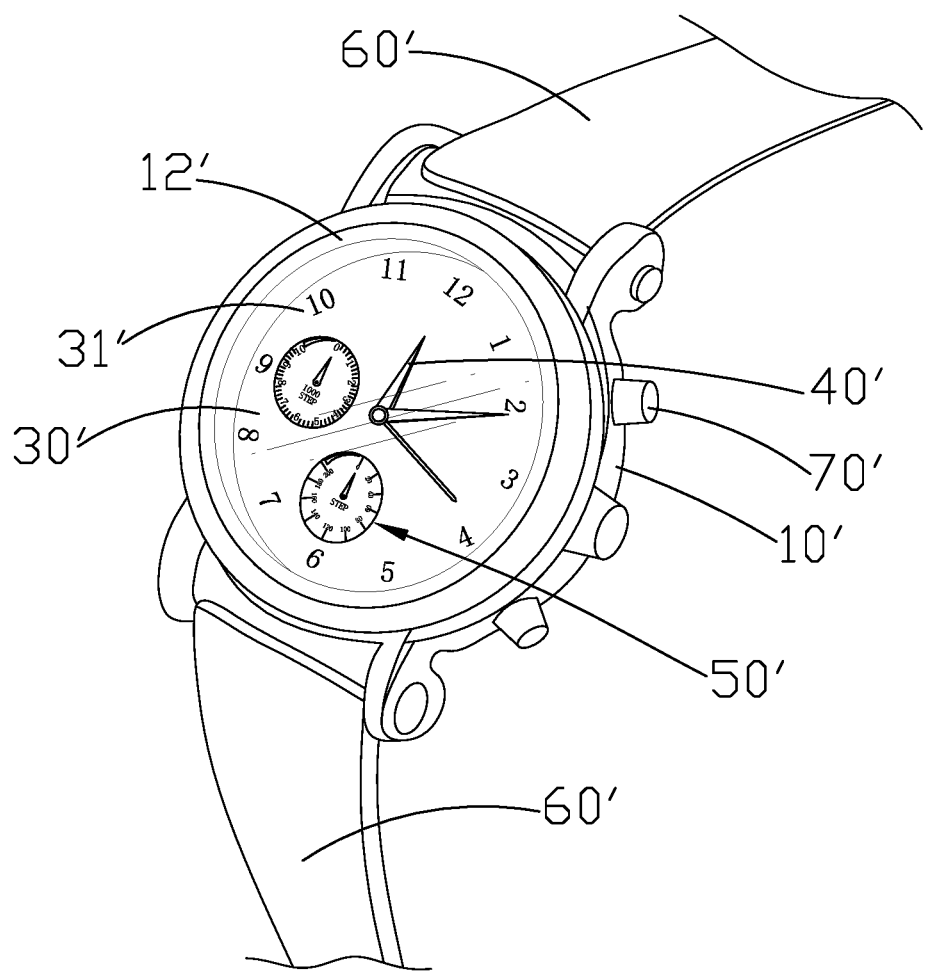
FIG. 5 is a perspective view of an analog timepiece according to a second preferred embodiment of the present invention.
Figure 6:
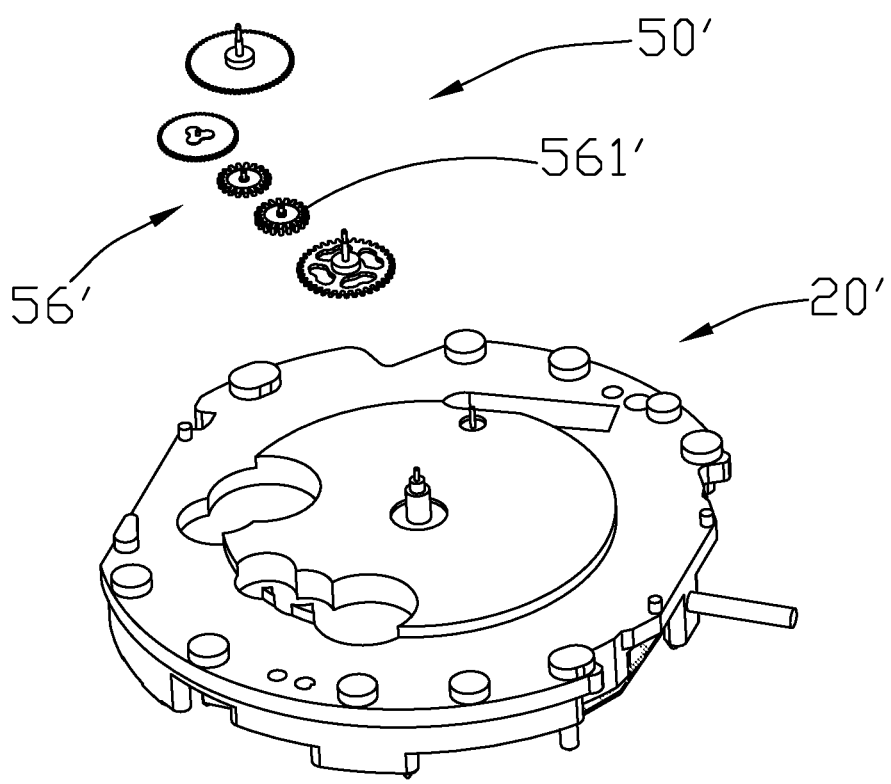
FIG. 6 is an exploded perspective view of the analog timepiece according to the second preferred embodiment of the present invention.
Figure 7:
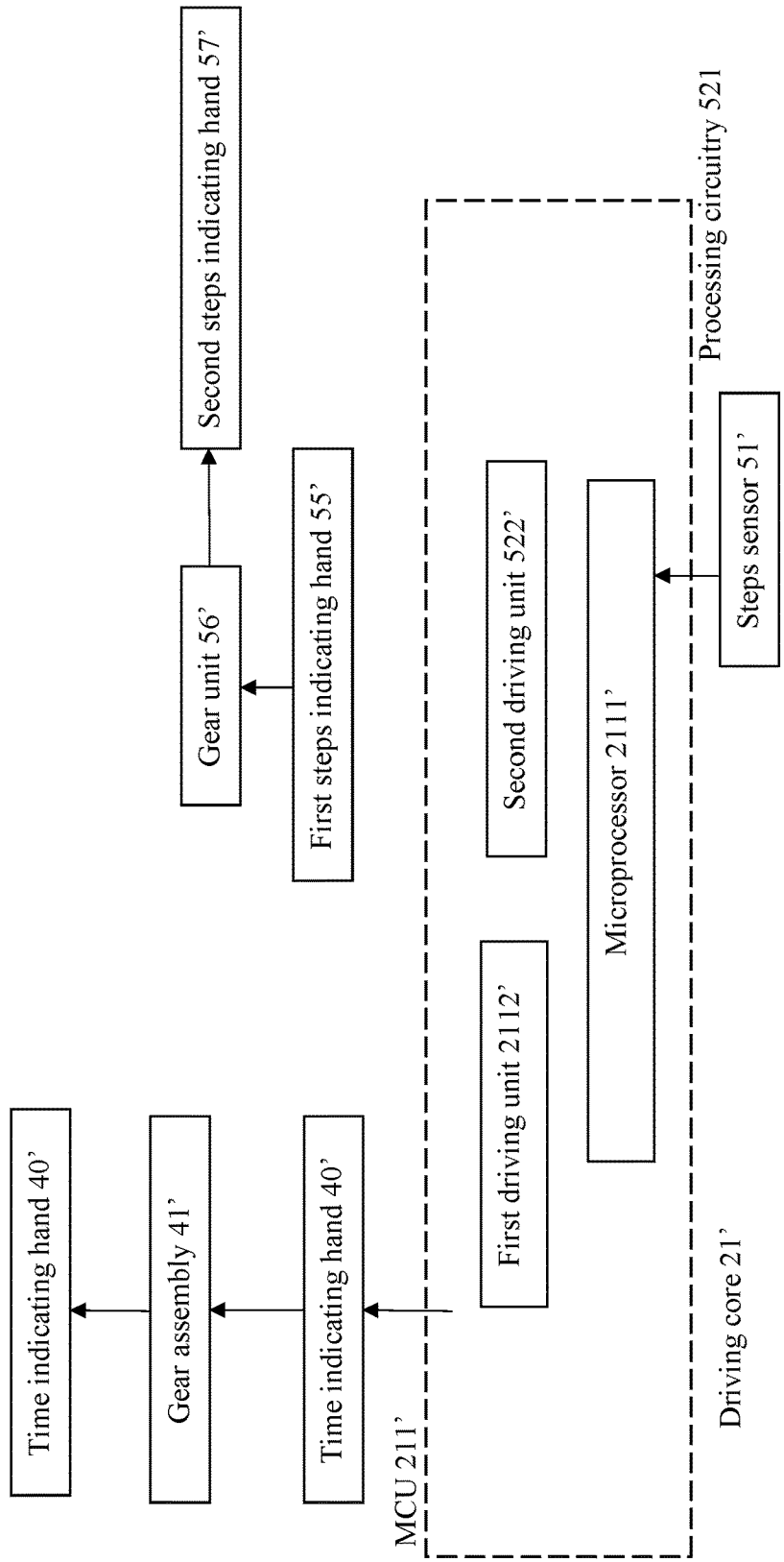
FIG. 7 is a block diagram of the internal structure of the analog timepiece according to the second preferred embodiment of the present invention.

Referring to FIG. 5 of the drawings, an analog timepiece according to a second preferred embodiment of the present invention is illustrated. The second preferred embodiment is similar to the first preferred embodiment described above, except that the control unit 52' may be incorporated with the microcontroller unit 211'.

Thus, according to the second preferred embodiment of the present invention, the main core unit 20' may have a microcontroller unit 211' for controlling illustration of time, and a control unit 52'. The microcontroller unit 211' and the control unit 52' may be electrically connected with each other and may share a common microprocessor and a Printed Circuit Board (PCB). The microprocessor 2111' and the second microprocessor 5211' described in the preferred embodiment above may be combined into a single microprocessor 210'.

In other words, the analog timepiece according to the second preferred embodiment may comprise a main casing 10', a main core unit 20' received in the main casing 10', a main dial 30', at least one time indicating hand 40', and a steps illustrating arrangement 50'.

The main core unit 20' may comprise a driving core 21' which may comprise a microcontroller unit (MCU) 211' for controlling illustration of time and illustration of steps. The main dial 30' may be supported in the main casing 10', and may have a plurality of time markings 31'. The time indicating hand 40' may be rotatably connected to the main core unit 20' at a position above the main dial 30'.

The steps illustrating arrangement 50' may comprise a step sensor 51', a first steps dial 53', a second steps dial 54', a first steps indicating hand 55', a gear unit 56' and a second steps indicating hand 57'.

The steps sensor 51' may be received in the main casing 10' and electrically connected to the main core unit 20' for sensing the number of steps of a wearer.

The first steps dial 53' and a second steps dial 54' may be provided on the main dial 30'. The first steps dial 53' may have a plurality of fine steps markings 531', while the second steps dial 54' may have a plurality of collective steps markings 541'.

The first steps indicating hand 55' may be rotatably connected to the main core unit 20' and positioned above the first steps dial 53'. The gear unit 56' may be connected to the first steps indicating hand 55'.

The second steps indicating hand 57' may be rotatably connected to the gear unit 56' and positioned above the second steps dial 54', in such a manner that when the steps sensor 51' senses a predetermined number of steps, the main core unit 20' may be to configured to drive the first steps indicating hand 55' to rotate one fine steps marking 531', wherein when the first indicating hand 55' moves over a predetermined number of fine steps markings 531', the second indicating hand 57' may be arranged to be driven by the gear unit 56' to move one collective steps marking 541' on the second steps dial 54'.

According to the second preferred embodiment of the present invention, the analog timepiece mentioned above may also be configured as having a number of variations as described in the first preferred embodiment above. Thus, the analog timepiece may further comprise a plurality of watch bands 60' extended from two sides of the main casing 10'.

The main core unit 20' may comprise a driving core 21' received in the main casing 20'. The driving core 21' may comprise a microcontroller unit (MCU) 211' that keeps time. The MCU 211' may comprise a processing circuitry 2113' which comprises a microprocessor 2111' for processing time information, and a first driving unit 2112' such as a step motor for driving the time indicating hand 40'.

The main dial 30' may be provided on the main casing 10' for providing the time markings 31'. The time indicating hand 40' may be connected to the main core unit 20' in a rotatably movable manner so that the time indicating hand 40' may rotate on the main dial 30' in an incremental manner. The time indicating hand 40' may be driven to rotate so as to point to predetermined time markings 31' for indicating time information. Thus, the time markings 31' may include second markings, minutes markings, and/or hour markings.

When more than one time indicating hands 40' are utilized, a gear assembly 41' may be connected to the time indicating hands 40' so as to drive the time indicating hands 40 to incrementally rotate in predetermined intervals. For example, when three time indicating hands 40' (namely, a second indicating hand, a minute indicating hand and a hour indicating hand) are utilized, the one of them may be connected to the main core unit 20' for indicating second information. The gear assembly 41' may be utilized so that when the second indicating hand has moved 60' second markings on the main dial 30', the minute indicating hand may move one minute maron the main dial 30', and when the minute indicating hand has moved 60' minute markings, the hour indicating hand may move one hour marking on the main dial 30'.

The main casing 10' may further comprise a cover 12' which may have a predetermined light transmissivity for allowing a user of the present invention to visually observe the main dial 30' and the time indicating hands 40' from an exterior of the main casing 10'. In the second preferred embodiment, the cover 12' may also be made of glass material so that it is transparent.

The steps sensor 51' of the steps illustrating arrangement 50' may be configured as a steps counter which is received in the main casing 10' for counting the number of steps a wearer of the present invention has moved. An exemplary embodiment of the steps sensor 51' may be a microelectromechanical (MEMS) inertial sensor. The step sensor 51' may be electrically connected to the MCU 211' so that steps information may be transmitted to the microprocessor 2111' for further processing. Thus, the microprocessor 2111' may be programmed to process and interpret the signals obtained from the steps sensor 51'.

The steps illustrating arrangement 50' may further comprise a second driving unit 522' such as a step motor received in the main casing 10'. The second driving unit 522' may be electrically connected to the MCU 211' so that it may be driven and controlled by the processing circuitry 2113'.

Figure 8:
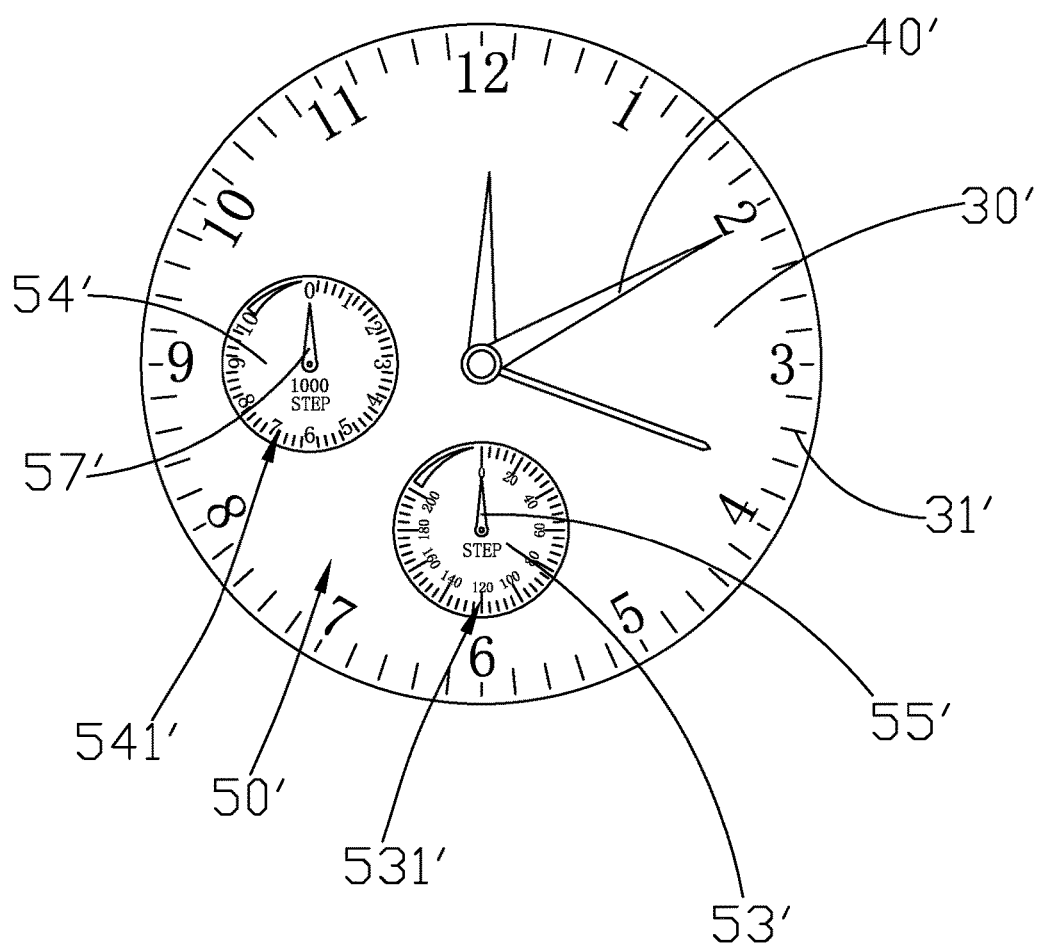
FIG. 8 is schematic diagram of the analog timepiece according to the second preferred embodiment of the present invention.

As shown in FIG. 8 of the drawings, each of the first steps dial 53' and the second steps dial 54' may have a circular cross sectional shape and may be provided on the main dial 30' for ease of being observed by a wearer of the present invention. The first step dial 53' may contain a predetermined number of fine steps markings 531' distributed on the first step dial 53'. In this second preferred embodiment, each fine steps marking 531' may represent four steps (or any other number of steps) moved by the user of the present invention. The first steps dial 53' may have altogether fifty fine steps markings 531' (or any other number of fine steps markings 531) formed thereon. Thus, when the first steps indicating hand 55' has rotated or traveled fifty fine steps markings 531' on the first steps dial 53', the user has actually walked 4×50=200 steps. The fine steps markings 531' may signify the number of steps a user has walked. For example, markings of "20", "40", "60", "80" . . . "200" may be formed on the first steps dial 53' to inform the user that twenty, forty, sixty, eighty . . . two hundred steps have been completed respectively, as shown in FIG. 8 of the drawings. Note that each fine step marking 531' may represent other number of steps sensed by the steps sensor 51'. The number of fine steps markings 531' on the first steps dial 53' may also be varied. The above-described numbers are for illustrative only and merely constitute the second preferred embodiment of the present invention.

On the other hand, the second steps dial 54' may have a predetermined number of collective steps markings 541' evenly distributed on the second steps dial 54'. In this first preferred embodiment, each collective steps marking 541' may represent two hundred steps (i.e. the maximum number of steps sensed by the steps sensor 51 and counted on the first steps dial 53) moved by the user of the present invention. The second steps dial 54' may have altogether fifty collective steps markings 541' formed thereon. Thus, when the second steps indicating hand 57' has rotated or traveled one circumference on the second steps dial 54', the user has actually walked 200×50=10,000 steps. Note that each collective step marking 541' may represent other number of steps sensed by the steps sensor 51'. The number of collective steps markings 541' on the second steps dial 54' may also be varied. The above-described numbers are for illustrative only and merely constitute the second preferred embodiment of the present invention.

As shown in FIG. 8 of the drawings and as in the first preferred embodiment, the fifty fine steps markings 531' may be distributed on the first steps dial 53' in a manner which resembles the first fifty seconds/minutes on a conventional dial for a timepiece. In other words, when the entire circumference of the first steps dial 53' represents 360°, the fifty fine steps markings 531' may be evenly distributed on a 300° sector of the first steps dial 53'. Similarly, the fifty collective steps markings 541' may be distributed on the second steps dial 54' in a manner which resembles the first fifty seconds/minutes on a conventional dial for a timepiece. When the entire circumference of the second steps dial 54' represents 360°, the fifty collective steps markings 541' may be evenly distributed on a 300° sector of the second steps dial 54'.

The gear unit 56' may connect the first steps indicating hand 55' to the second steps indicating hand 57' in such a manner that when the first steps indicating hand 55' has moved fifty fine steps markings 531' (i.e. the first steps indicating hand 55' has traveled through all of the fine steps marking 531' formed on the first steps dial 53'), the gear unit 56' may be arranged to drive the second steps indicating hand 57' to move one collective steps marking 541' on the second steps dial 54'. The gear unit 56' may comprise a plurality of gears 561' connecting the first steps indicating hand 55' to the second steps indicating hand 57'.

At the same time, when the first steps indicating hand 55' has traveled 50 fine steps markings 531' on the first steps dial 53', the MCU 211' may rapidly drive the first steps indicating hand 55' through the second driving unit 522' to move on the first steps dial 53' back to the initial starting position of the first steps indicating hand 55' so that it may be prepare to start a next cycle of steps illustration. By observing the position of the first steps indicating hand 55' and the second steps indicating hand 57', a user of the present invention may visually observe the number of steps that he has traveled. This feature is in stark contrast with conventional digital smart watches because for conventional smart watches, the number of steps are not displayed in digital form.

When the second steps indicating hand 57' has traveled to the 10,000 steps mark as represented by the collective steps marking 541' (i.e. the second steps indicating hand 57' has traveled through all the collective steps markings 541' on the second steps dial 54'), the MCU 211' may be configured to drive the first step indicating hand 56' through the second driving unit 522' to rapidly move on the first steps dial 53' so as to drive the second steps indicating hand 57' back to the "0" step position, which may be the initial starting position of the second steps indicating hand 57'.

Thus, the analog timepiece of the present invention may further comprise a plurality of actuation buttons 70' provided on the main casing 10' for actuating the operation of the steps illustrating arrangement 50'. The actuation buttons 70' may be utilized for activating the steps illustrating arrangement 50' so that the analog timepiece may start counting steps. Moreover, the actuation buttons 70' may allow the user to reset the first steps indicating hand 55' and the second steps indicating hand 57' back to their original starting positions respectively.

The present invention, while illustrated and described in terms of a preferred embodiment and several alternatives, is not limited to the particular description contained in this specification. Additional alternative or equivalent components could also be used to practice the present invention.

What is claimed is:

1. An analog timepiece, comprising:
   a main casing;
   a main core unit received in said main casing;
   a main dial supported in said main casing, said main dial having a plurality of time markings;
   at least one time indicating hand rotatably connected to said main core unit at a position above said main dial; and
   a steps illustrating arrangement, which comprises:
   a steps sensor received in said main casing for sensing the number of steps of a wearer;
   a control unit electrically connected to said steps sensor;
   a first steps dial and a second steps dial provided on said main dial, first steps dial having a plurality of fine steps markings, said second steps dial having a plurality of collective steps markings;
   a first steps indicating hand rotatably connected to said control unit and positioned above said first steps dial;
   a gear unit connected to said first steps indicating hand; and
   a second steps indicating hand rotatably connected to said gear unit and positioned above said second steps dial, in such a manner that when said steps sensor senses a predetermined number of steps, said control unit is configured to drive said first steps indicating hand to rotate one fine steps marking, wherein when said first indicating hand move over a predetermined number of fine steps markings, said second indicating hand is arranged to be driven by said gear unit to move one collective steps marking on said second steps dial.

2. The analog timepiece, as recited in claim 1, wherein said control unit comprises a steps processing circuitry and a second driving unit received in said main casing, said steps processing circuitry comprising a second microprocessor, said steps sensor being connected to said second microprocessor, which is configured to process and interpret signals obtained from said steps sensor.

3. The analog timepiece, as recited in claim 2, wherein each fine steps marking is arranged to represent a predetermined number of steps sensed by said steps sensor, said first steps dial having a predetermined number of fine steps markings formed on said first steps dial.

4. The analog timepiece, as recited in claim 3, wherein each collective steps marking is arranged to represent a maximum number of steps counted on said first steps dial, said second steps dial having a predetermined number of collective steps markings formed on said second steps dial.

5. The analog timepiece, as recited in claim 4, wherein said gear unit may comprise a plurality of gears connecting said first steps indicating hand to said second steps indicating hand, in such a manner that when said first steps indicating hand moves all of said fine steps markings on said first steps dial, said gear unit is arranged to drive said second steps indicating hand to move one collective steps marking on said second steps dial.

6. The analog timepiece, as recited in claim 5, wherein said steps processing circuitry is configured such that when said first steps indicating hand travels through all of said fine steps markings on said first steps dial, said second driving unit is arranged to rapidly drive said first steps indicating hand to move back to an initial starting position on said first steps dial.

7. The analog timepiece, as recited in claim 6, wherein said steps processing circuitry is configured such that when said second steps indicating hand travels through all of said collective steps markings on said second steps dial, said second driving unit is arranged to drive said first step indicating hand to rapidly move on said first steps dial so as to drive said second steps indicating hand back to an initial position on said second steps dial.

8. The analog timepiece, as recited in claim 7, wherein said main core unit comprises a driving core received in said main casing, said driving core comprising a microcontroller unit which comprises a time processing circuitry and a first driving unit for driving said time indicating hand to indicate time, said time processing circuitry comprising a first microprocessor for processing and keeping time information.

9. The analog timepiece, as recited in claim 8, wherein each fine steps marking is arranged to represent four steps sensed by said steps sensor, said first steps dial having a total of fifty fine steps markings formed on said first steps dial.

10. The analog timepiece, as recited in claim 9, wherein each collective steps marking is arranged to represent two hundred steps counted on said first steps dial, said second steps dial having a total of fifty collective steps markings formed on said second steps dial.

11. An analog timepiece, comprising:
a main casing;
a main core unit received in said main casing, said main core unit comprising a driving core which comprises a microcontroller unit for controlling illustration of time and steps, said microcontroller unit comprising a processing circuitry, a first driving unit, and a second driving unit;
a main dial supported in said main casing, said main dial having a plurality of time markings;
at least one time indicating hand rotatably connected to said first driving unit of said main core unit at a position above said main dial; and
a steps illustrating arrangement, which comprises:
a steps sensor received in said main casing and electrically connected to said microcontroller unit of said main core unit for sensing the number of steps;
a first steps dial and a second steps dial provided on said main dial, said first steps dial having a plurality of fine steps markings, said second steps dial having a plurality of collective steps markings;
a first steps indicating hand rotatably connected to said second driving unit of said microcontroller unit and positioned above said first steps dial;
a gear unit connected to said first steps indicating hand; and
a second steps indicating hand rotatably connected to said gear unit and positioned above said second steps dial, in such a manner that when said steps sensor senses a predetermined number of steps, said steps monitoring module of said main core unit is configured to drive said first steps indicating hand to rotate one fine steps marking, wherein when said first indicating hand move over a predetermined number of fine steps markings, said second indicating hand is arranged to be driven by said gear unit to move one collective steps marking on said second steps dial.

12. The analog timepiece, as recited in claim 11, wherein said processing circuitry comprising a microprocessor, said steps sensor being connected to said microprocessor, which is configured to process and interpret signals obtained from said steps sensor.

13. The analog timepiece, as recited in claim 12, wherein each fine steps marking is arranged to represent a predetermined number of steps sensed by said steps sensor, said first steps dial having a predetermined number of fine steps markings formed on said first steps dial.

14. The analog timepiece, as recited in claim 13, wherein each collective steps marking is arranged to represent a maximum number of steps counted on said first steps dial, said second steps dial having a predetermined number of collective steps markings formed on said second steps dial.

15. The analog timepiece, as recited in claim 14, wherein said gear unit may comprise a plurality of gears connecting said first steps indicating hand to said second steps indicating hand, in such a manner that when said first steps indicating hand moves all of said fine steps markings on said first steps dial, said gear unit is arranged to drive said second steps indicating hand to move one collective steps marking on said second steps dial.

16. The analog timepiece, as recited in claim 15, wherein said processing circuitry is configured such that when said first steps indicating hand travels through all of said fine steps markings on said first steps dial, said second driving unit is arranged to rapidly drive said first steps indicating hand to move back to an initial starting position on said first steps dial.

17. The analog timepiece, as recited in claim 16, wherein said processing circuitry is configured such that when said second steps indicating hand travels through all of said collective steps markings on said second steps dial, said second driving unit is arranged to drive said first step indicating hand to rapidly move on said first steps dial so as to drive said second steps indicating hand back to an initial position on said second steps dial.

18. The analog timepiece, as recited in claim 17, wherein said processing circuitry of said main core unit is configured to control said first driving unit to drive said time indicating hand to move on said main dial for indicating time.

19. The analog timepiece, as recited in claim 18, wherein each fine steps marking is arranged to represent four steps sensed by said steps sensor, said first steps dial having a total of fifty fine steps markings formed on said first steps dial.

20. The analog timepiece, as recited in claim 19, wherein each collective steps marking is arranged to represent two hundred steps counted on said first steps dial, said second steps dial having a total of fifty collective steps markings formed on said second steps dial.

\* \* \* \* \*